Figure 1:
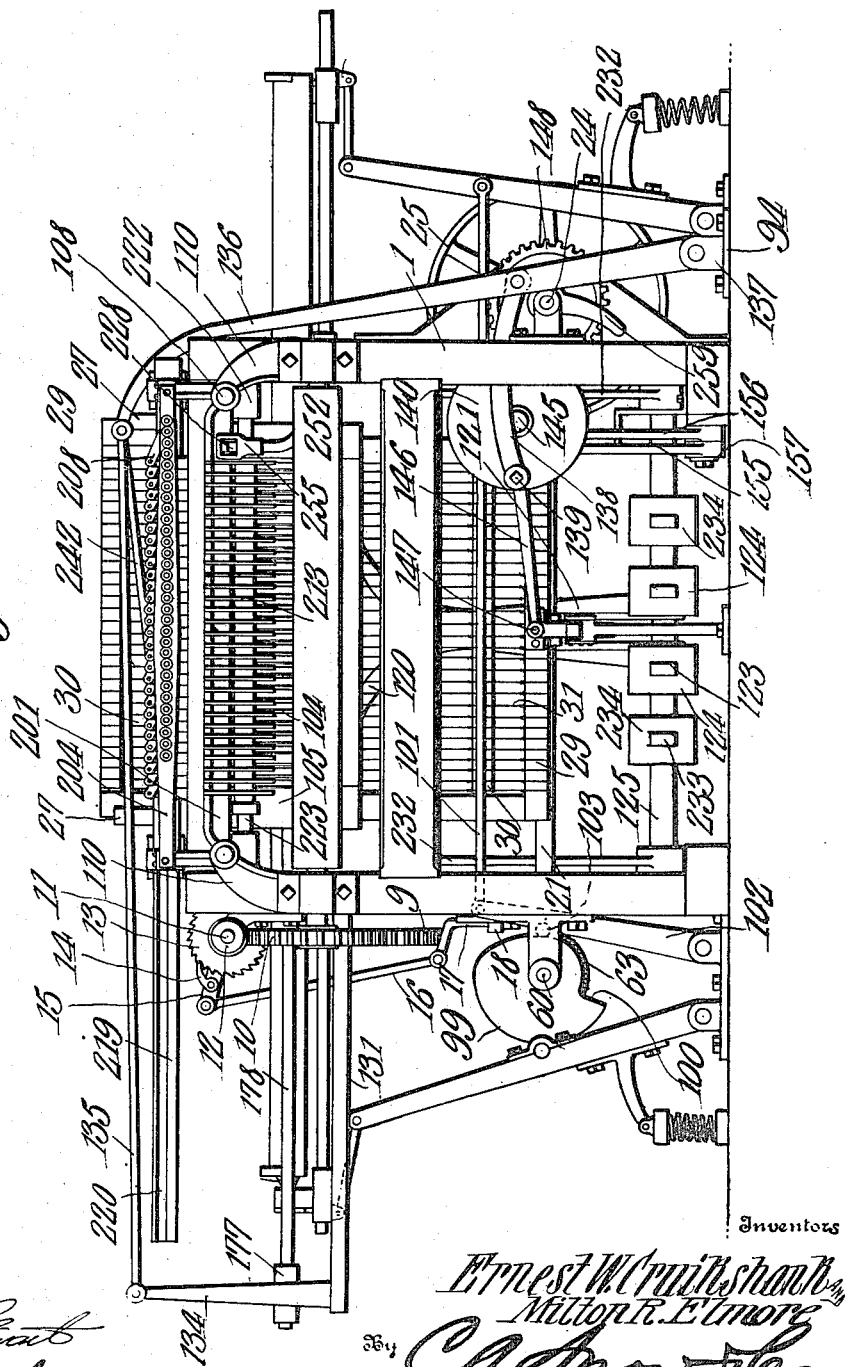

E. W. CRUIKSHANK & M. R. ELMORE.
LOOM FOR WEAVING PILE FABRICS.
APPLICATION FILED MAR. 8, 1910.

1,027,995.

Patented May 28, 1912.
12 SHEETS—SHEET 1.

Witnesses
E. P. Stewart
F. T. Chapman.

Inventors
Ernest W. Cruikshank
Milton R. Elmore
By C. A. Snow & Co.
Attorneys

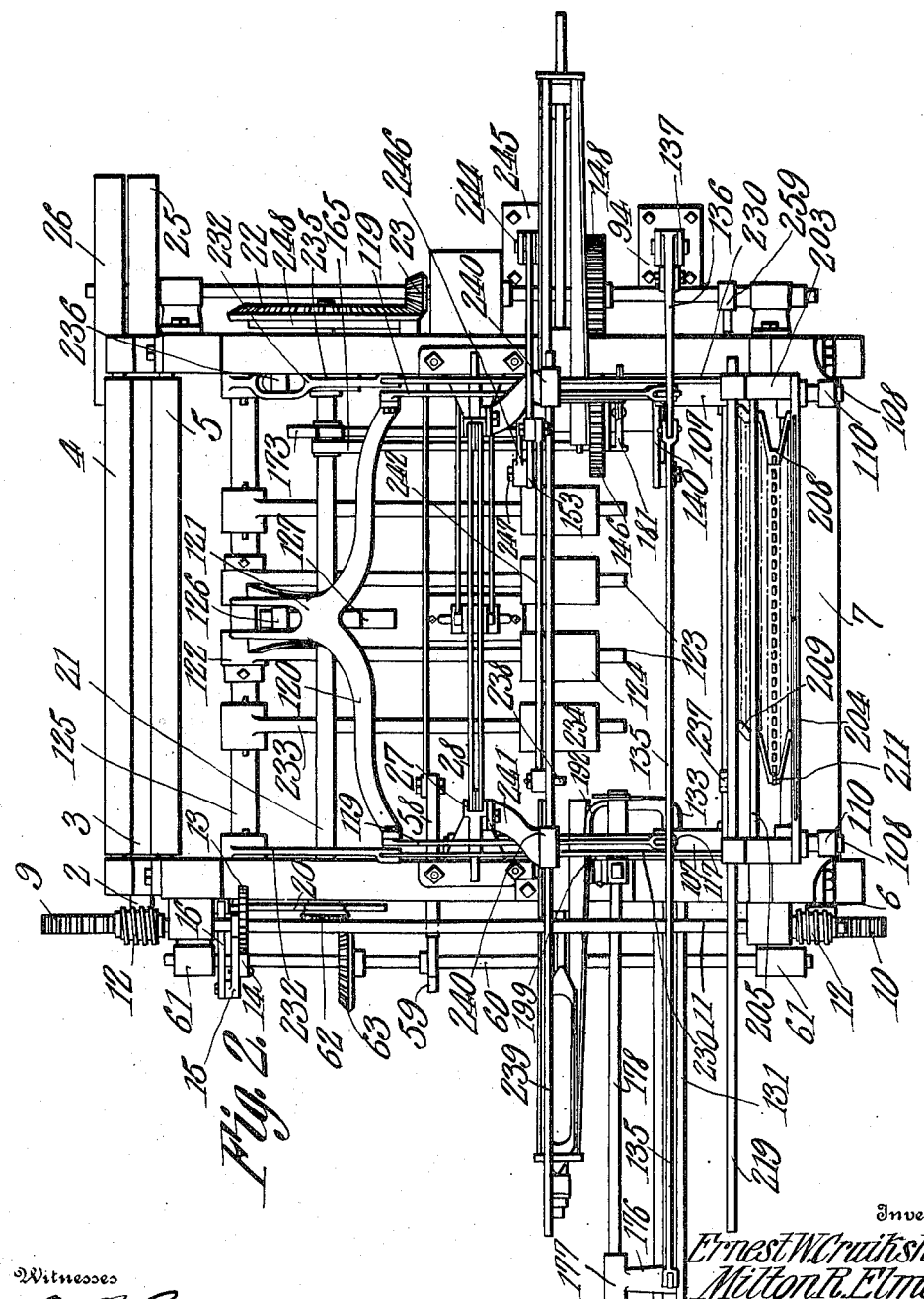

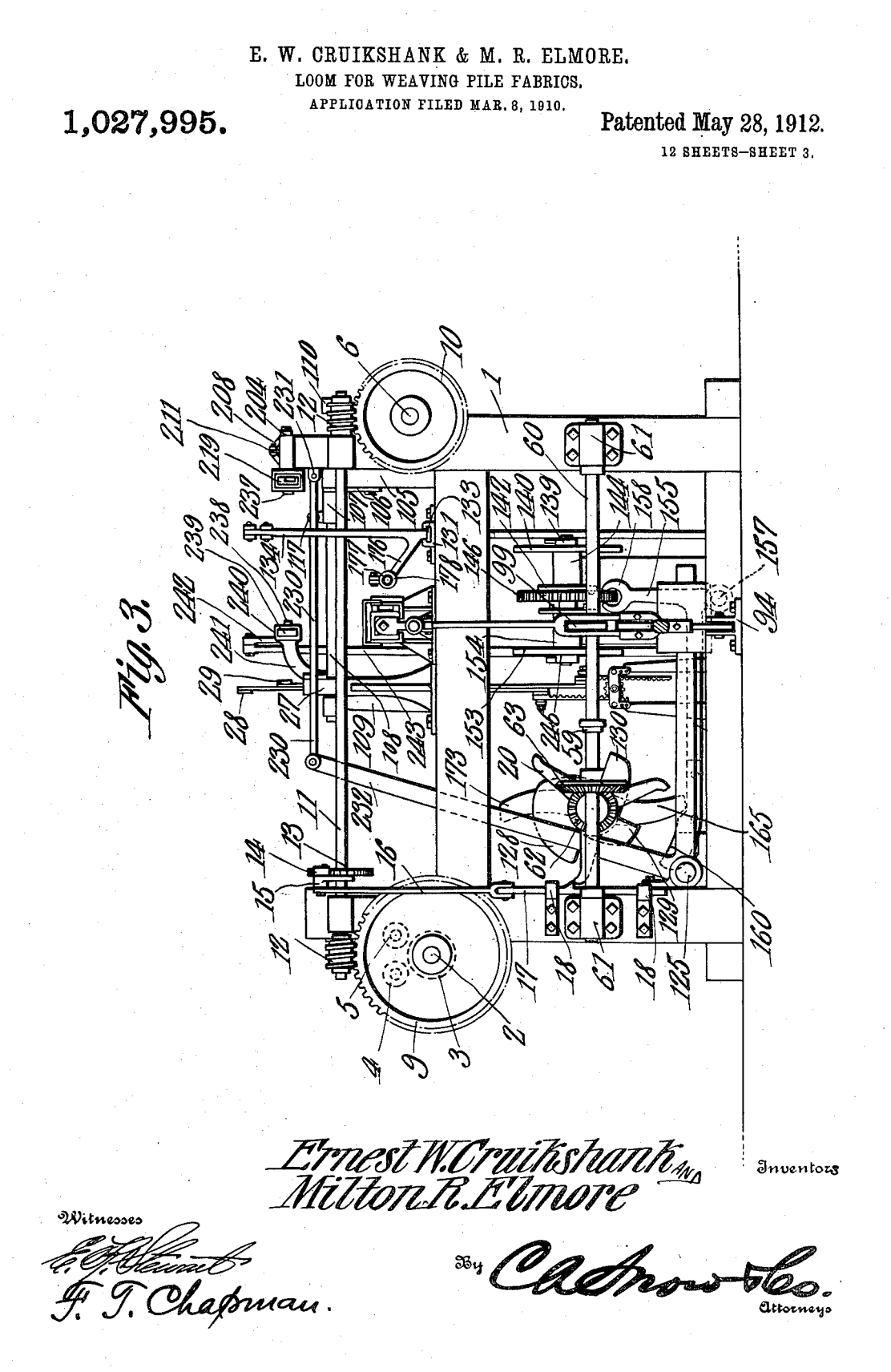

E. W. CRUIKSHANK & M. R. ELMORE.
LOOM FOR WEAVING PILE FABRICS.
APPLICATION FILED MAR. 8, 1910.

1,027,995.

Patented May 28, 1912.
12 SHEETS—SHEET 3.

Inventors
Ernest W. Cruikshank and
Milton R. Elmore

Witnesses
By C. A. Snow & Co.
Attorneys

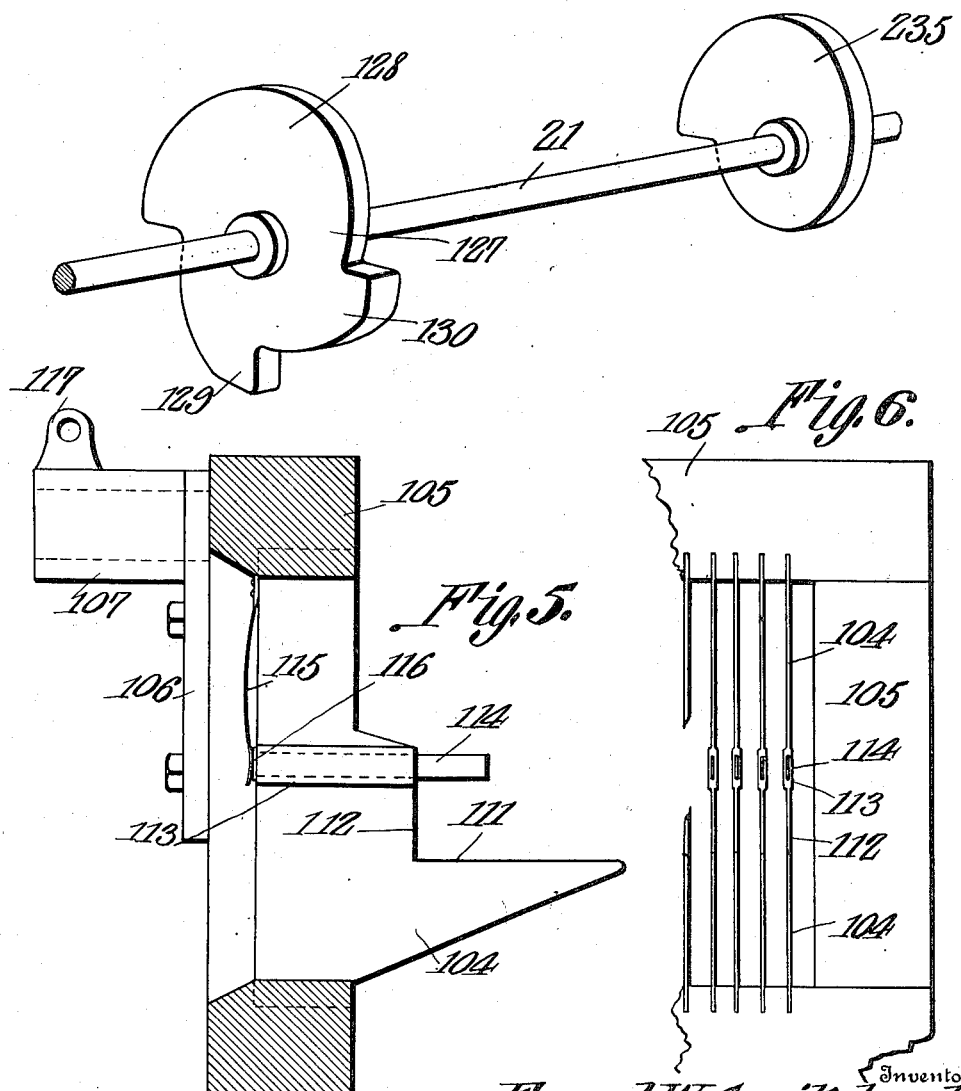

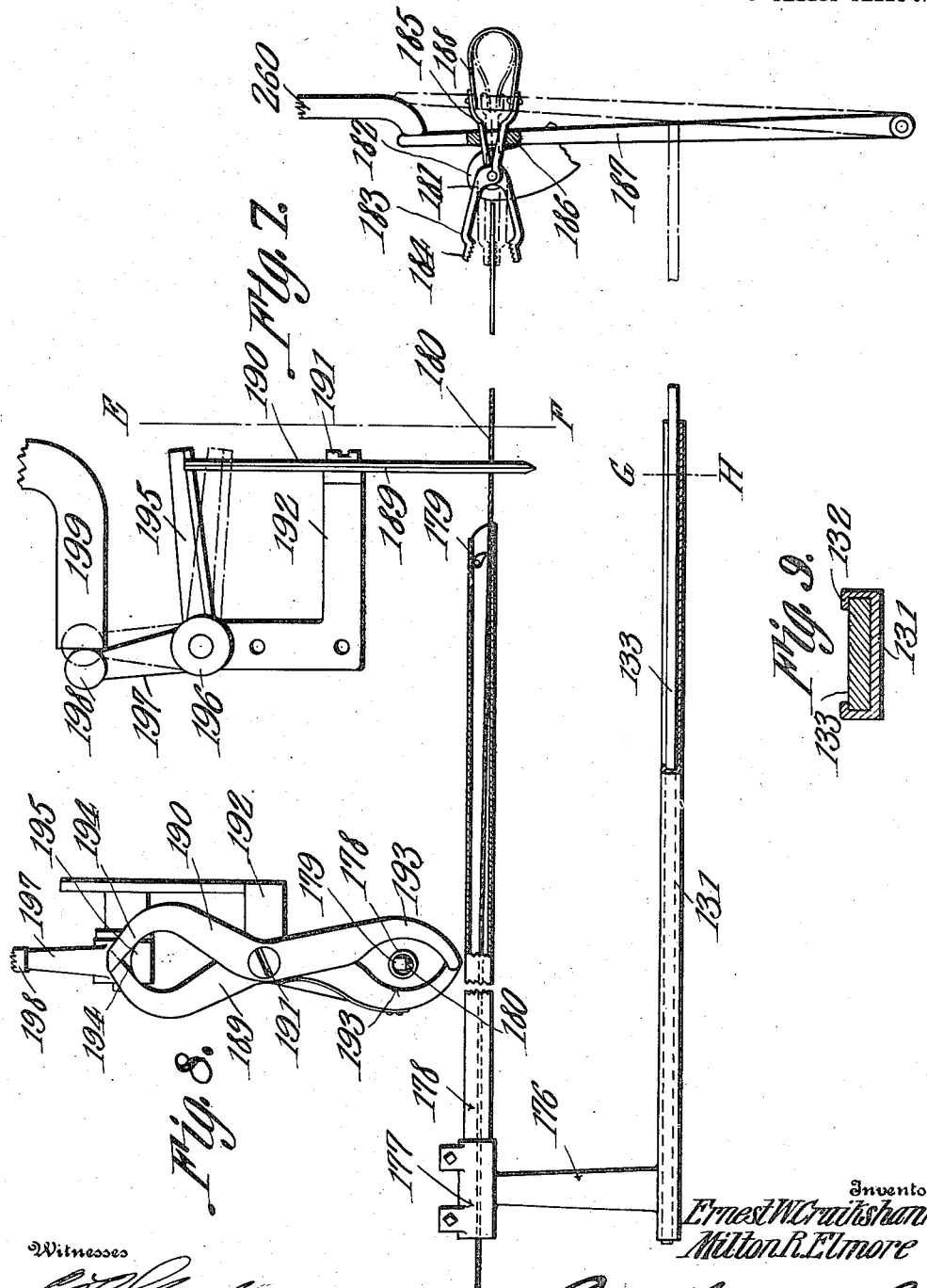

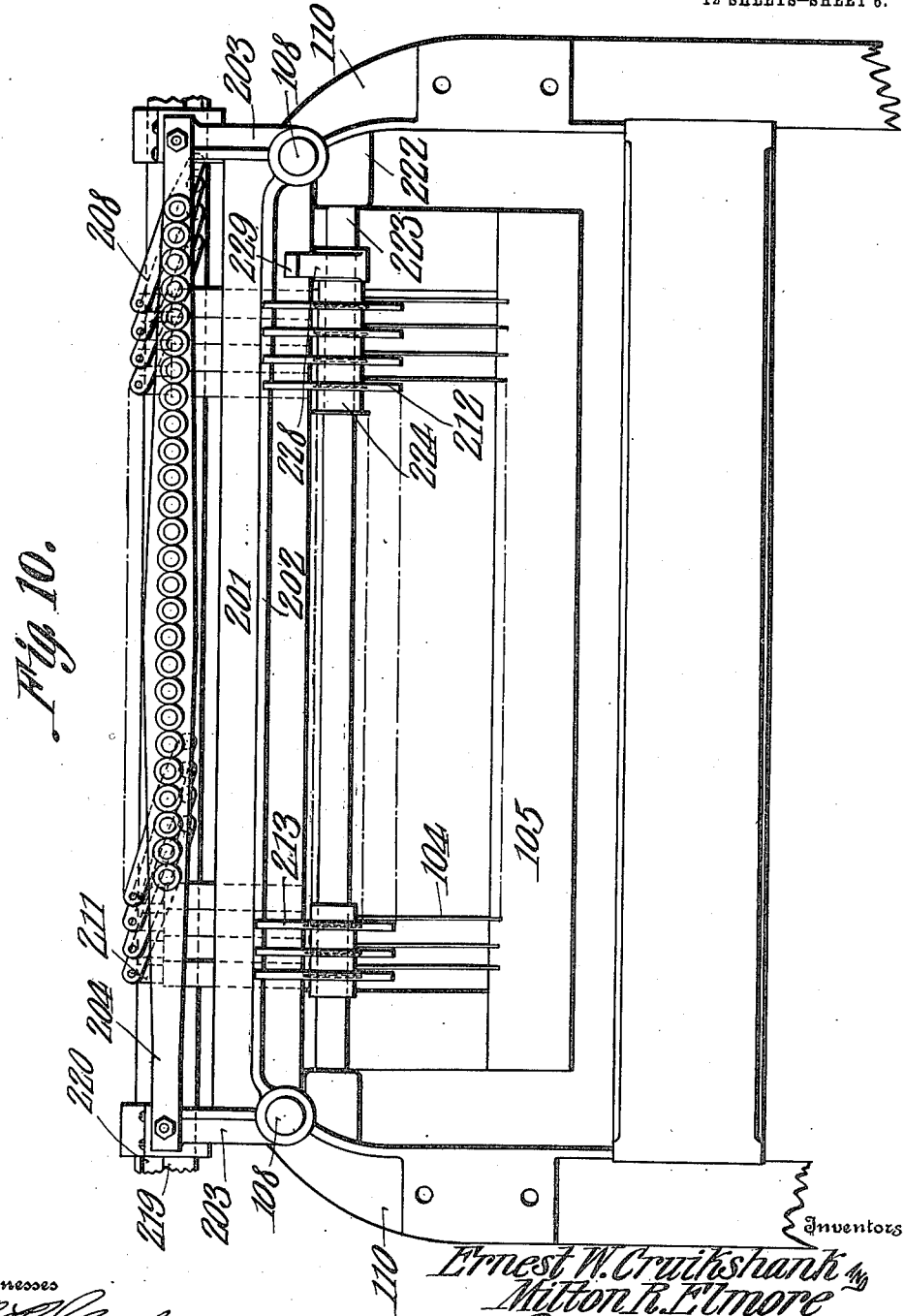

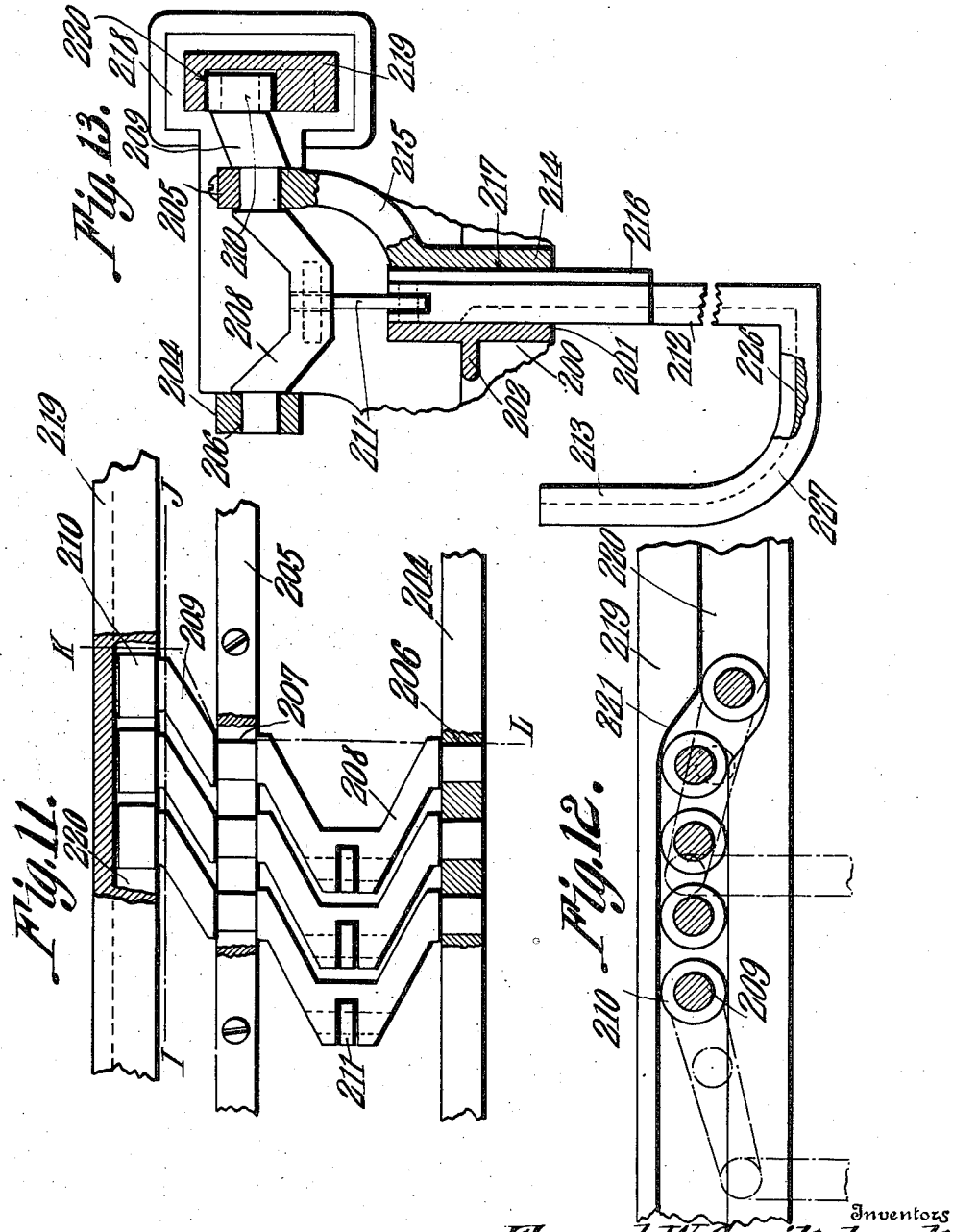

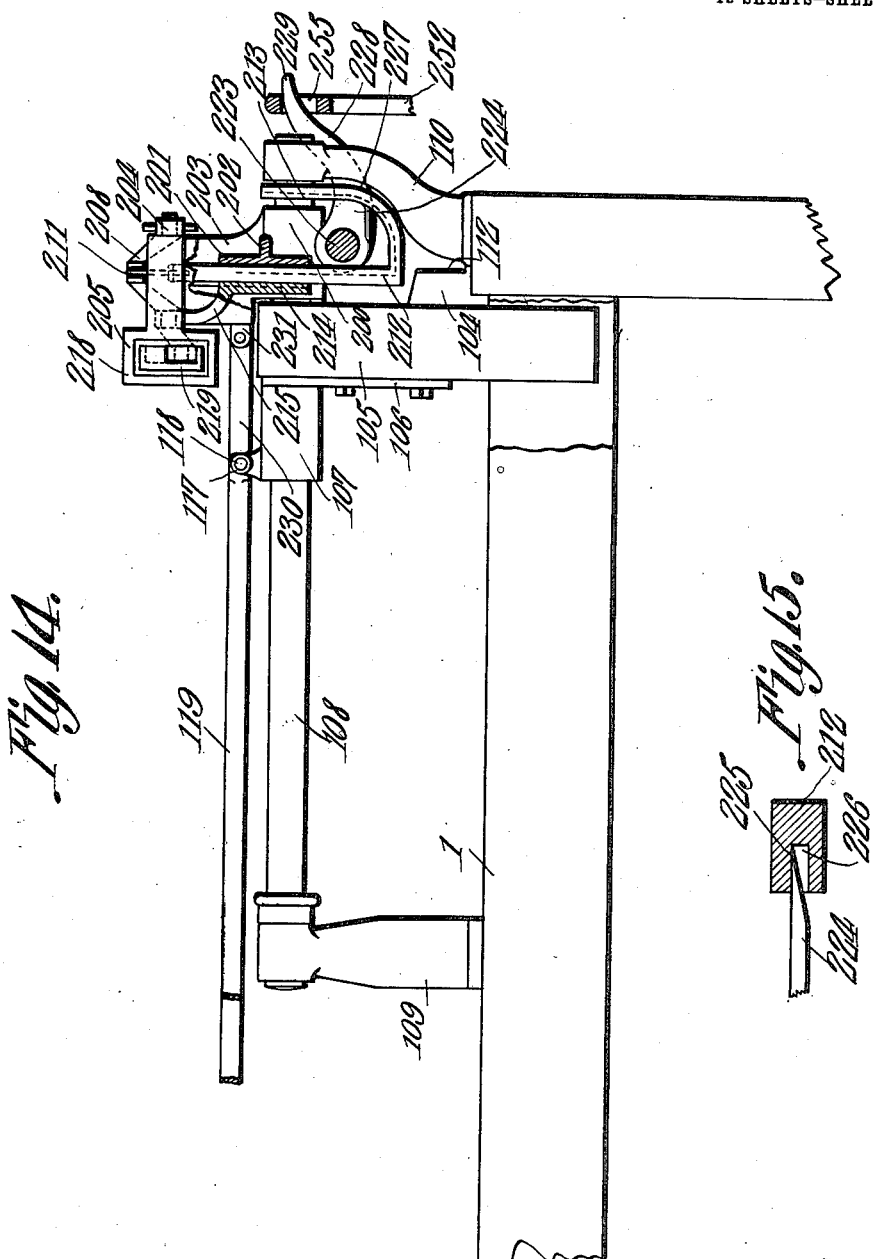

E. W. CRUIKSHANK & M. R. ELMORE.
LOOM FOR WEAVING PILE FABRICS.
APPLICATION FILED MAR. 8, 1910.

1,027,995.

Patented May 28, 1912.
12 SHEETS—SHEET 9.

Witnesses
F. T. Chapman.

Inventors
Ernest W. Cruikshank,
Milton R. Elmore

By C. A. Snow & Co.
Attorneys

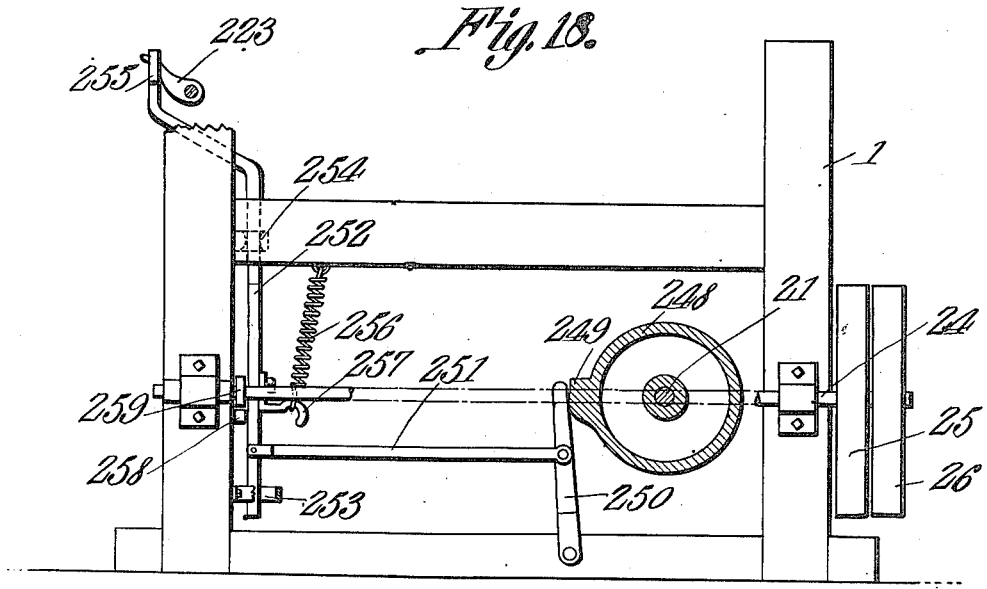
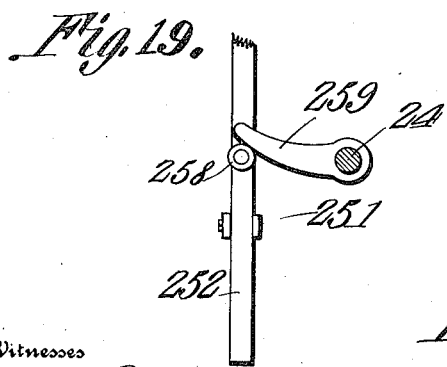
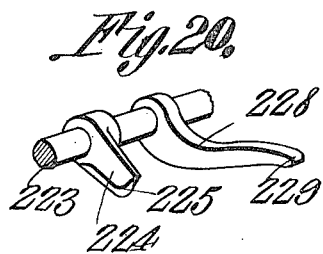

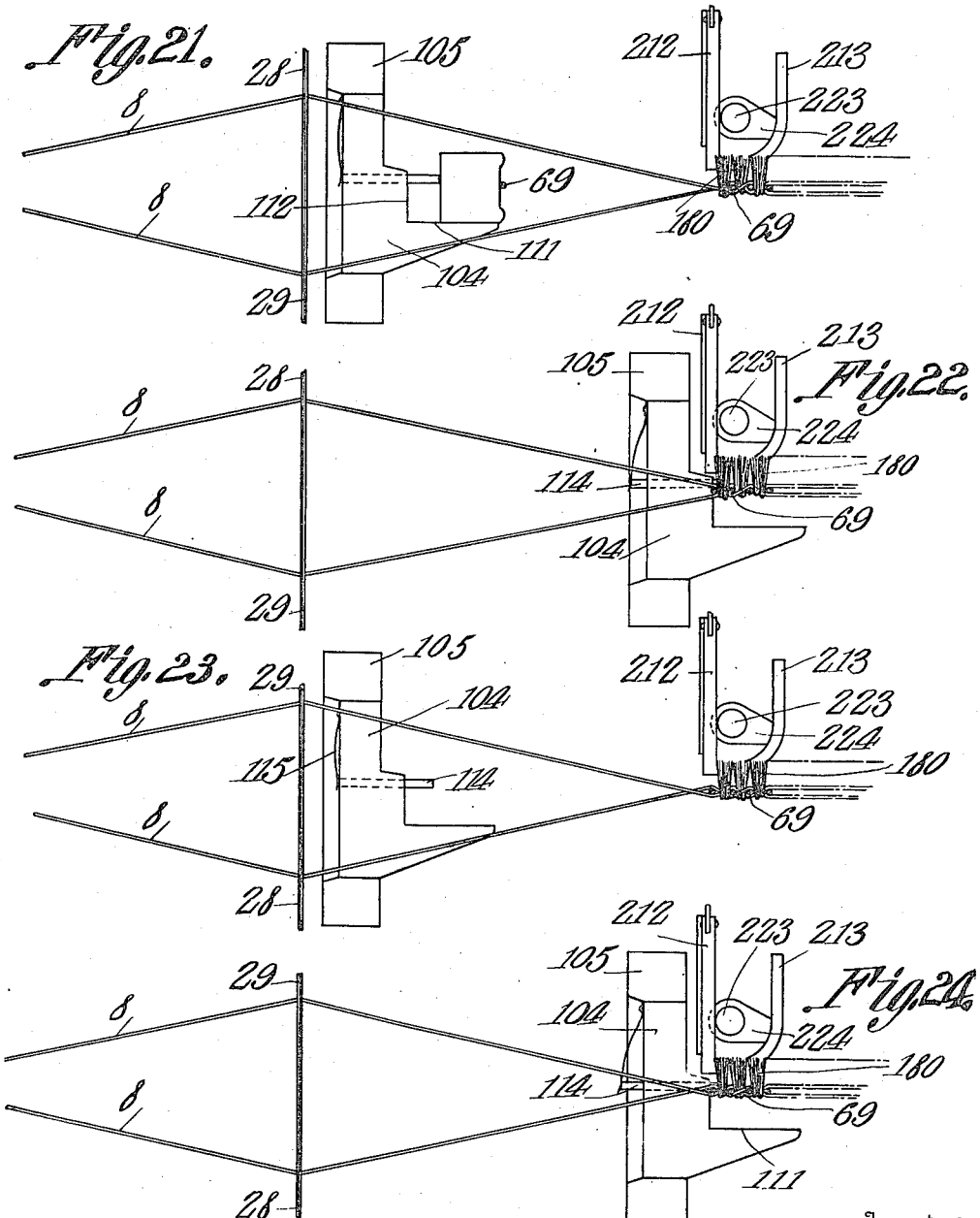

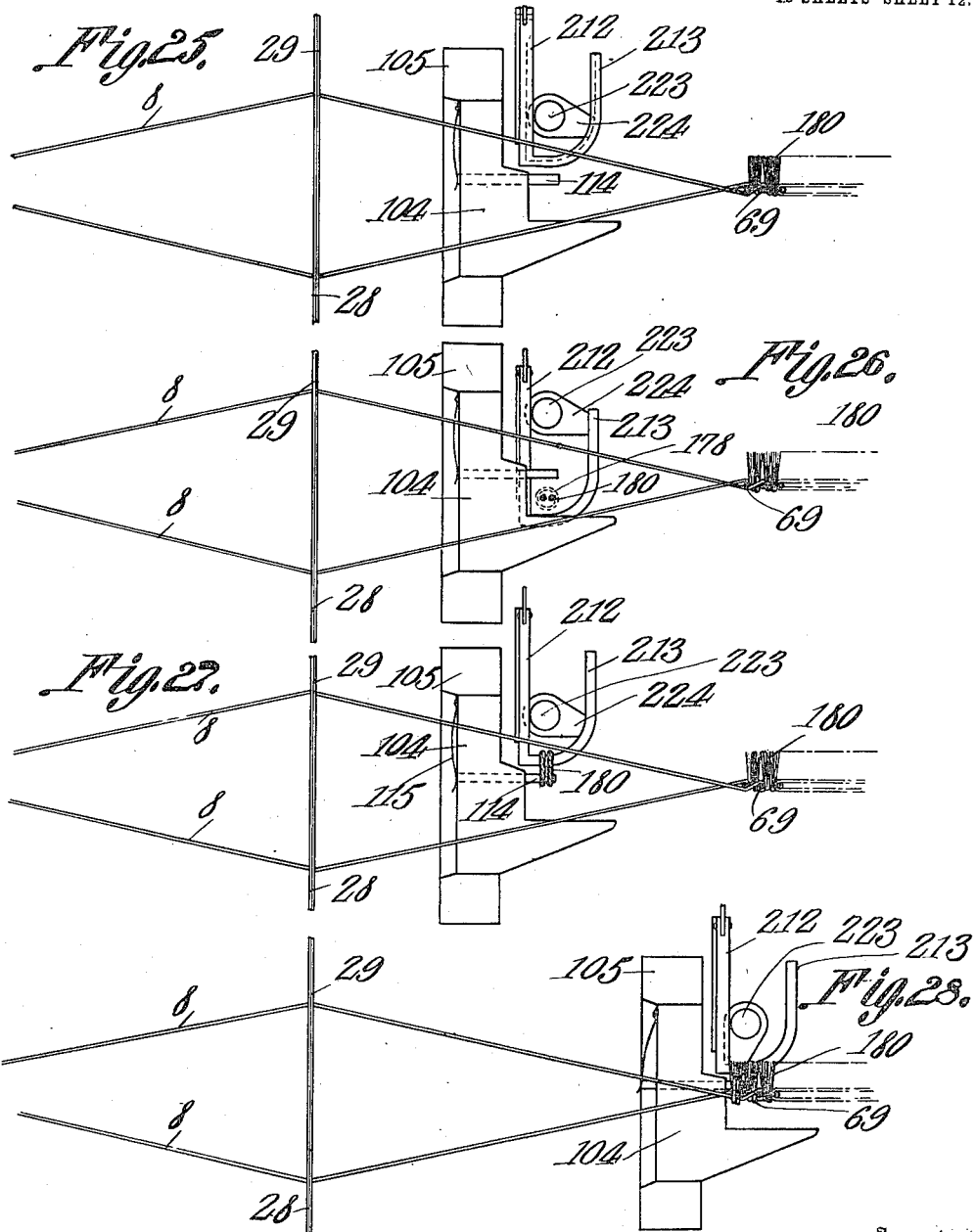

UNITED STATES PATENT OFFICE.

ERNEST W. CRUIKSHANK AND MILTON R. ELMORE, OF BALTIMORE, MARYLAND; SAID ELMORE ASSIGNOR TO ELLA CRUIKSHANK, OF BALTIMORE, MARYLAND.

LOOM FOR WEAVING PILE FABRICS.

1,027,995.  Specification of Letters Patent.  Patented May 28, 1912.

Application filed March 8, 1910. Serial No. 547,999.

*To all whom it may concern:*

Be it known that we, ERNEST W. CRUIKSHANK and MILTON R. ELMORE, citizens of the United States, residing at Baltimore, State of Maryland, have invented a new and useful Loom for Weaving Pile Fabrics, of which the following is a specification.

This invention has reference to improvements in looms and its object is to provide a loom especially adapted to the weaving of tufted or pile fabrics and more particularly for the weaving of coir mats.

In accordance with the present invention the warp and weft strands or yarns are woven together in the usual manner, although the present invention contemplates certain improvements in the structures operating on these strands, while the tuft or pile yarns, or thrums, there being usually but two such yarns, are fed into the machine parallel with the weft and are then looped and cut and locked in the fabric by mechanism embodying the present invention, all the operations being automatic and in proper timed relation.

The tuft strands or yarns which may consist of one or two or more strands, but which in the operation of the machine are treated as one strand, will hereinafter be considered as one strand or yarn and will be so designated with the understanding that the term includes two or more separate yarns or strands as well as a single strand. Such tuft strand is fed across the warp shed and gripped and then by the operation of a series of suitable devices acting progressively the strand is formed into a series of loops between the warp strands, additional tuft strand being drawn into the machine for the purpose, and then the tuft strand is severed from the portion entering the loom and is then carried by the beater blades against a previously laid weft strand or thread to be followed by the next succeeding weft strand under a second action of the beater blades, the looped tuft strand being in the meantime cut at the outer ends of the loops so that the raw ends constitute the wearing surface of the finished fabric.

The invention also contemplates suitable mechanism whereby these several operations are performed automatically and in timed relation in an expeditious manner and without undue strain or wear on the parts making up the loom.

The invention will be best understood from a consideration of the following detail description taken in connection with the accompanying drawings forming a part of this specification, in which drawings:—

Figure 16:
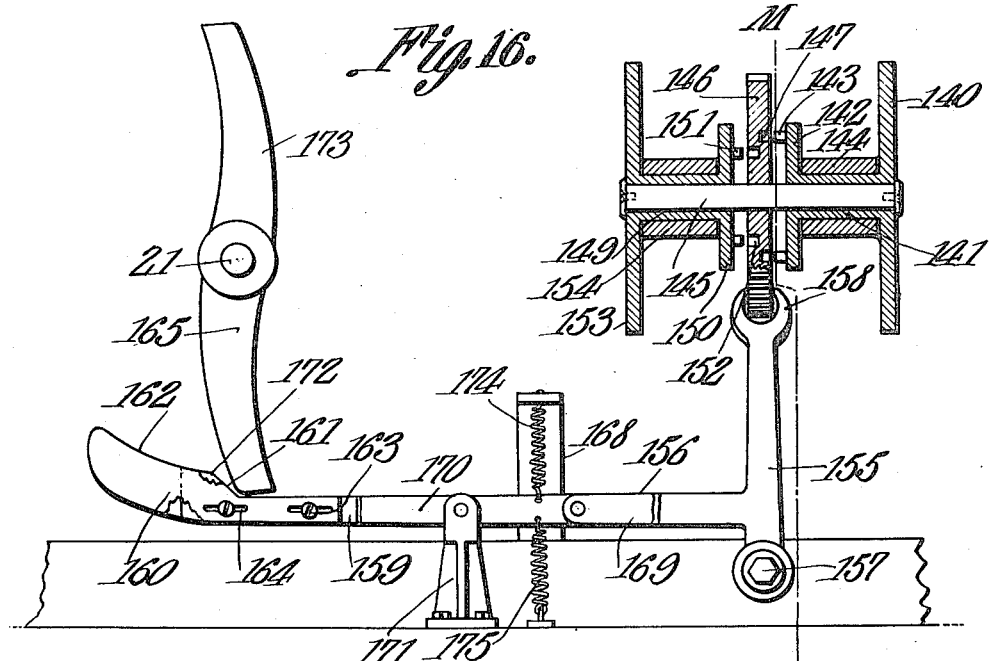
Figure 17:
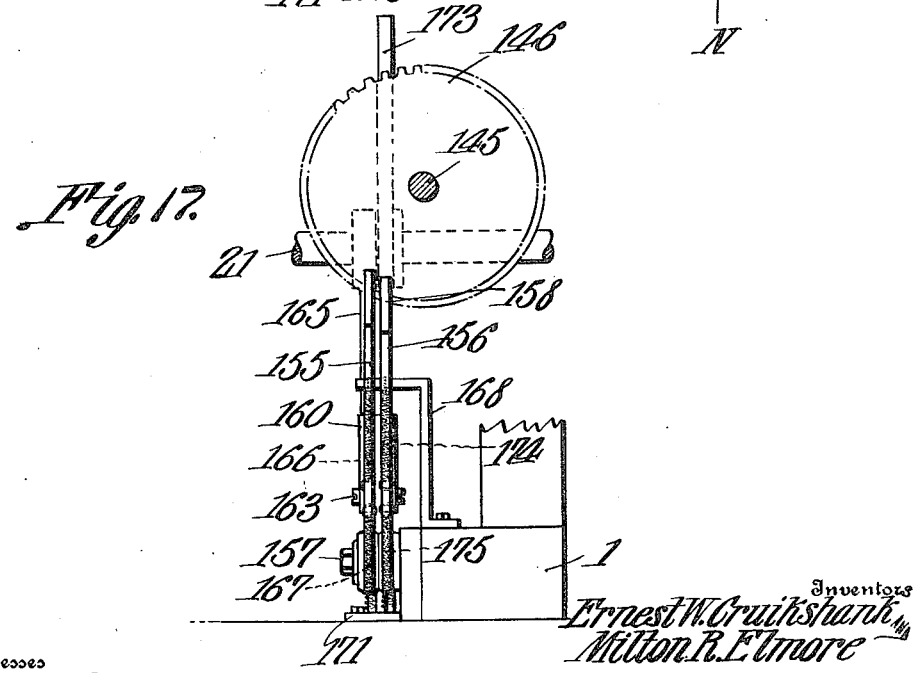

Figure 1 is an elevation of the loom as viewed from the delivery end of the structure. Fig. 2 is a plan view of the loom. Fig. 3 is an elevation with parts removed of the left hand side of the machine as viewed in Figs. 1 and 2. Fig. 4 is a perspective view of cams used in connection with the loom. Fig. 5 is a detail section through the reed showing one of the beater blades in elevation. Fig. 6 is a view, at right angles to the showing of Fig. 5, of a portion of the reed. Fig. 7 is a detail elevation, with parts in section, of the tuft yarn feeding and gripping mechanism and also showing the means for severing the tuft yarn or strand. Fig. 8 is a section on line E—F of Fig. 7. Fig. 9 is a section on the line G—H of Fig. 7 but on a larger scale. Fig. 10 is an elevation of the tuft forming frame showing tuft hooks and operating mechanism therefor. Fig. 11 is a plan view, with parts in section, of a number of the tuft hook cranks or rock shafts and the operating bar therefor. Fig. 12 is a section on the line I—J of Fig. 11. Fig. 13 is a section on the line K—L of Fig. 11 showing one of the tuft strand lifting hooks in place. Fig. 14 is an elevation showing the upper right hand end of the structure of Fig. 3 on a larger scale with some parts in section and other parts omitted. Fig. 15 is a detail section showing a portion of one of the tuft lifting hooks and the tuft severing knife coöperating therewith. Fig. 16 is a detail view, with parts in section, showing the shifting mechanism for the clutch for throwing the shuttle actuating disk and the tuft mechanism actuating disk. Fig. 17 is a section on the line M—N of Fig. 16. Fig. 18 is a detail view of a portion of the actuating mechanism. Figs. 19 and 20 are perspective views of a portion of the structure shown in Fig. 18. Figs. 21 to 28 both inclusive are diagrams illustrating the operation of the loom.

Referring to the drawings there is shown a main frame 1 suitably designed to support the several mechanisms entering into the construction of the loom, and it will be understood that this frame may be otherwise shaped than shown for the support of the several mechanisms. Near one end of the frame there is journaled a shaft 2 carrying a roller 3 and in normal engagement with the roller 3 are other rollers 4, 5. At the other end of the machine there is journaled a shaft 6 carrying a roller 7.

Entering the loom between the rollers 3, 4 and 5 are warp threads or yarns 8 shown in Figs. 32 to 39 and the finished fabric passes out of the loom over the roller 7 to be wound on a drum not shown in the drawings or to be disposed of in any other suitable manner. The shaft 2 carries a worm gear 9 and the shaft 6 carries a worm gear 10, these gears being located in the showing of the drawings at one side of the loom outside the frame 1.

Mounted in suitable bearings on the frame 1 is a shaft 11 carrying at each end a worm 12 in mesh with the respective gears 9 and 10. On the shaft 11 there is mounted a ratchet wheel 13. This ratchet is actuated by a pawl 14 on an arm 15 mounted on and capable of turning on the shaft 11 and to the outer end of the arm 15 there is connected a link 16 pivoted at the lower end to a slide 17 mounted in bearings 18 on the main frame and provided with a tooth 19 in the path of radial arms 20 on a shaft 21 extending across the main frame near the lower portion thereof and supported in suitable bearings. At the other end, that is remote from the end carrying the arms 20 the shaft 21 is provided with a bevel gear wheel 22 in mesh with a pinion 23 on a shaft 24 journaled in bearings on the same side of the frame 1, and this shaft 24 carries tight and loose pulleys 25, 26 for the application of power to the loom by means of a suitable belt.

It will be understood of course that the tight and loose pulleys are simply symbolical of any source of power and may be replaced with an electric motor or any other means whereby power may be applied to the shaft 24.

It will be observed that the shaft 24 and the shaft 21 are rotating continuously, but the shaft 11 has intermittent rotative motion imparted thereto because of the engagement of the arms 20 with the tooth 19 on the slide 17, these arms lifting the slide 17 and thereby through the link 16 and arm 15 causing the pawl 14 to move the ratchet wheel 13 a commensurate distance, the arm 15 and slide 17 dropping by gravity, or if desired under the influence of a spring to the initial position ready for turning the wheel 13 when the next arm 20 engages the tooth 19.

The shuttle race between the terminals is made up of beater blades 104 carried by a reed frame 105. The reed frame 105 is carried at the ends by brackets 106 terminating in sleeves 107 surrounding guide and supporting rods 108 at opposite sides of the frame 1 and these rods are upheld by standards 109 110, appropriately mounted on the frame 1. The rods 108 extend in the same direction as the travel of the warp strands through the machine and the reed frame 105 has an extent of movement along the rods 108 so that at one limit of its travel the blades 104 have each an edge 111 so disposed as together to form the shuttle race between the terminal members of the race and the blades 104 have each another edge 112 so disposed as to engage the weft strands after being laid by the shuttle, and to carry it by the travel of the reed to its other limit into the desired relation to the warp strands to be bound in place by the shift of the heddles and the warp strands carried thereby. Each blade 104 is intermediately enlarged as shown at 113 and is there provided with a passage for a flat pin 114 projecting from the beater edge 112 and overlying the shuttle race edge 111. The pin 114 normally projects beyond the edge 112 and is maintained yieldingly in such position by a spring 115 fast at one end to the rear edge of the respective beater blade 104 and at the other end bearing against the corresponding end of the respective pin 114. Any means may be employed for preventing the pin 114 from projecting under the action of the spring 115 beyond a definite distance and in the drawings such means are typified by a head or enlargement 116 on the rear end of the pin 114, this head being engaged by the end of the spring 115 which in the particular showing of the drawings is a leaf spring, but of course any other means for the projection of the pin 114 may be substituted for this leaf spring.

Attached to the sleeve 107 by means of ears 117 and pivot pins 118 are links 119 pivotally secured at the other ends to the free ends of diverging arms 120 of a lever 121 formed with spaced fulcrum hubs 122 from which extend arms 123 carrying weights 124 adjustable along said arms. The hubs 122 are mounted on a shaft 125 but are not connected to said shaft, the latter being journaled in suitable bearings near the lower portion of that end of the frame 1 into which the warp strands are introduced.

Fast to the lever 121 near the pivot point thereof is a roller 126 in the path of a cam 127 on the shaft 21. This cam 127 is a multiple cam having an active member 128 embracing about one half the circumference of the cam and other active members 129, 130 together including the other half of the cam, so that in each revolution of the shaft 21 the lever 121 will be actuated by the cam three times with an interval of rest between two of the active movement equal to the time of actuation by one of the cam members 129 and 130, the cam 127 being suitably shaped for this purpose. The cam 127 is best shown in Fig. 5 although also visible in Figs. 2 and 3.

The weights 124 on the arm 123 have a normal tendency to so move the lever 121 as to carry the reed frame 105 in a direction to force the weft strand to the crossing points of the warp strands, while the cams 128, 129 and 130 act on the lever 121 to move the same in a direction which will carry the reed frame to the other limit of its travel where the edges 111 are in the path of the shuttle, constituting the intermediate portion of the shuttle race.

In conjunction with the weaving structures already described there is provided a tuft forming mechanism comprising means for feeding the tuft yarn, means for forming and positioning the loops of the tuft yarn, and means for cutting these loops to expose the raw ends which constitute the tread surface of the finished fabric.

The means for supplying the tuft yarn are shown in Figs. 1, 2 and 3 and more in detail in Figs. 7, 8, and 9 and also in Figs. 12 and 13.

Secured to the frame 1 and extending beyond one side of the said frame, say to the left hand side as viewed in Fig. 2 is a supporting guide or track 131 having a laterally extended lower member with upstanding side members spaced apart with the upper edges of the side members inturned as indicated at 132 in Fig. 9 to override the bottom member in spaced relation thereto, the inner edges of the overhangs 132 being also spaced apart. On the track between the side members and confined thereto by the overhangs 132 is a bar 133 of sufficient length for a purpose which will hereinafter appear. Near the outer end the bar 133 has secured thereto an arm 134 connected by a link 135, (see Figs. 1 and 2) to the upper end of a lever 136 on the other side of the machine and pivotally supported at the lower end between ears 137 on the plate 94 at said end of the machine. At an intermediate point the lever 136 is connected by a link 138 to a pin 139 eccentrically carried on a disk 140 on one end of a sleeve 141, see Fig. 16, having at the end remote from the disk 140 another disk 142 provided on the face remote from the sleeve 141 with laterally projecting pins 143. The sleeve 141 is mounted in a bearing 144 supported appropriately by the frame 1 or an extension thereof. It will be understood of course that the disk 140, with its crank pin 139 may be replaced by a crank arm.

Traversing the sleeve 141 is a shaft or rod 145 carrying a gear wheel 146 adjacent to the disk 142 and this gear wheel may be provided with recesses 147 matching the pins 143 so that when the gear wheel 146 is moved toward the disk 142 the pins 143 will enter the recesses 147 or some of them and rotative movement imparted to the gear wheel 146 will be in turn imparted to the disk 142 and to the sleeve 141 and the disk 140. The gear wheel 146 is in mesh with another gear wheel 148 on the drive shaft 24 (see Fig. 2) so that the gear wheel 146 receives motion constantly from said drive shaft 24 through the gear wheel 148.

The shaft or rod 145 has thereon another sleeve 149 similar to the sleeve 141 but on the opposite side of the gear wheel 146 therefrom. The sleeve 149 carries a disk 150 having on the face remote from the sleeve 149 projecting pins 151 movable into and out of recesses 152 on the corresponding face of the gear wheel 146. The sleeve 149 on the end remote from the disk 150 carries a disk 153 which is a crank disk similar to the disk 140. The sleeve 149 is mounted in bearings 154 similar to the bearings 140. The purpose of the disk 153 will appear hereinafter.

In the operation of the loom rotative movement is imparted to the disks 140 and 153 at different times and for certain periods of time but the two disks are not in motion simultaneously. To drive the disk the gear wheel 146 is provided and this gear wheel is made movable longitudinally of the rod or shaft 145 upon which it may turn freely. For this purpose there are provided two bell crank levers 155, 156 pivoted at 157 to an appropriate point of the main frame 1. One arm of each bell crank lever 155 is formed with opposed fingers 158 at its free end in embracing relation to the gear wheel 146. The other arm of the bell crank lever 155 is elongated as shown at 159 and at the free end carries a shoe 160 having a cam face 161 leading to a curved edge 162 which latter extends from the cam face 161 to the outer end of the shoe. This shoe is adjustably connected to the end of the arm 159 by screws or bolts 163 extending through slots 164 in said shoe.

The cam face 161 and the curved edge 162 are in the path of an arm 165 on the shaft 21, the arm 159 being of sufficient length and the parts being so proportioned and located that when the free end of the arm 165 when rotating with the shaft 21 comes into engagement with the cam face 161, the arm 159 of the lever 155 will be depressed thus carrying the fingers 158 on the other arm of the lever 155 in a direction to cause the gear wheel 146 to move from a normally intermediate position between the disks 142 and 150 to engaging relation with the pins 151 of the disk 150 so that during the time the arm 165 is in engagement with the arm 159 the disk 146 will impart rotative movement to the disk 153 and parts connected to said disk will be actuated. In order that the time of engagement of the gear wheel 146 with the disk 150 may be prolonged the free end of the arm 165 remains for a time in engagement with the curved edge 162 of the shoe 160. This edge 162 of the shoe 160 is so related to the shaft 21 that during the time the arm 165 is in engagement therewith no further movement of the arm 159 is caused.

The arm 159 and with it the lever 155 is maintained in a normally central position by opposed springs 166, 167 each attached at one end to the arm 159 and one attached at the other end to the frame 1 or other fixed point while the other end of the other spring is attached to a bracket 168 mounted on the frame 1.

The lever 156 is similar to the lever 155 except that instead of a long arm 159 it has a short arm 169 in turn connected to a lever 170 mounted on a supporting standard 171 this lever having at the end remote from the connection with the arm 169 a cam edge 172 similar to the cam edge 161 of the shoe 160, and this cam edge 172 is in the path of an arm 173 mounted on the shaft 21 and projecting from said shaft, in the particular showing of the drawings, in a direction diametrically opposite from the arm 165 but displaced from said arm 165 along the shaft 21 for a sufficient distance to engage the cam edge 172. The lever 156 is centralized like the lever 155 by opposed springs 174, 175, one carried by the bracket 168 and the other connected to a fixed point of the frame 1 or other support. When the arm 173 engages the cam 172 of the lever 170, the lever 156 will be moved in a direction to cause the gear wheel 146 to be brought into engaging relation to the pins 143 of the disk 142 and the disk 140 will therefore be rotated an appropriate distance which distance is sufficient to give the disk 140 one complete rotation thereby through the link 138 causing a movement of the lever 136 through one complete reciprocation in the two directions of its movement, and the parts are so proportioned that this movement is sufficient through the link 135 and arm 134 to cause the bar 133 to move along the track 131 from its normal position shown in Fig. 1 where it is at the left hand end of its travel, to the right hand end thereof and back again to the normal position.

The bar 133 has fast thereon an arm 176 terminating in a collar 177 carrying one end of a tube 178 extending parallel with the bar 133 for the distance adapting it to perform the operations to be described. Near the end of the tube 178 remote from the collar 177 is mounted a pawl 179 so proportioned and mounted as to grip an article moving toward the other end of the tube 178 but permit movement of such article toward that end of the tube 178 remote from the collar 177.

The tube 178 is designed for the passage of strands 180 constituting the tuft strands, and while in the particular showing of the drawings two such strands are illustrated lying side by side, it will be understood that a single strand may be used or more than two strands may be employed if desirable. Since the two strands 180 are operated upon the same as one strand, it will be understood that the term "tuft strand" includes one or more strands when acted upon simultaneously in the manner to be described.

When the bar 133 is moved toward the right as viewed in the drawings, a tuft strand extending through the tube 178 to and through the end carrying the pawl 179 will be gripped by the pawl and carried along with the tube 178 as it traverses the loom, the tuft strand of course coming from a suitable source of supply which latter has been omitted from the showing of the drawings.

The tube 178 is so located as to traverse the loom through the warp shed immediately adjacent to the path of the shuttle through the warp shed between the same and the crossing point of the warp strands, but the parts are so timed in operation that the shuttle is not active when the tuft strand carrier is traversing the loom.

In the path of the delivery end of the tube 178, that is the end carrying the pawl 179, but located on the other side of the loom from the supports of the tube 178, is a gripper 181 suitably supported on a bracket 182 mounted on an appropriate portion of the frame 1. The gripper comprises two pivoted blades 183 having gripping ends 184 adapted to engage and hold the strand 180 when introduced there between, and the blades 183 are brought together. The end of the gripper remote from the blades 183 is formed into cam extensions 185 passed through a slot 186 in a lever 187 which latter is in the path of the bar 133 when moved with the tube 178 across the loom, the bar 133 being sufficiently long for the purpose. The construction is such that when the tube 178 is moved across the loom and the projecting end of the strand 180 which extends slightly beyond the end of the tube 178 is brought between the jaws 183, the lever 187 is then in position to permit the opening of the jaws 184, but before the motion of the tube 178 has ceased the bar 133 has been brought into engagement with the lever 187 nearer to the pivot point thereof than the gripper 181 and this lever has been moved away from the pivot point of the gripper so that the cam portions 185 are engaged and the jaws 184 are brought together in engaging relation to the strand 180, the gripper remaining in this position until released. The lever 187 is returned to its normal position to permit the jaws 184 to separate by means to be hereinafter described. The separation of the jaws 184 is brought about by a spring 188 fast to the ends of the arms 185, this spring being put under compressive stress when the jaws 184 are brought together.

The tuft strand 180 is severed at the proper time from the portion coming from the tube 178 by means best shown in Figs. 7 and 8. Two shear blades 189, 190 are pivoted together at an intermediate point by a pivot screw or pin 191 carried by a bracket 192 fast at an appropriate point on the frame 1 or an extension thereof. These blades are so shaped that under normal conditions the ends recede one from the other and then approach and there overlie one another. At one end of the blades 189 and 190 their curved portions are traversed by the tube 178 when it is caused to travel toward the gripper 181, and the facing edges 193 of the corresponding ends of the arms 189 and 190 constitute shear edges which when made to pass each other engage the strand 180 and sever the same. The other ends of the arms 189 and 190 are formed with cam edges 194 and between these cam edges there is normally lodged one arm 195 of a lever 196 appropriately pivoted on the bracket 192 while the other arm 197 of this lever has a projection 198 in the path of a member 199 to be hereinafter referred to, the construction being such that when the lever 196 is rocked on its pivot support in an appropriate direction the arm 195 will engage the cam edges 194 and cause the corresponding ends of the arms 189 and 190 to separate thus bringing the shear edges 193 at the other ends of the arms into operative relation to the strand 180 causing the severing of the latter. This operation is brought about in proper timed relation to certain other parts of the structure not yet described but will be referred to at the proper point in the description.

After the tuft strand has been laid across the warp shed it is formed into loops which are woven into the fabric and at the same time are cut so that the raw ends are exposed at, and constitute the wearing surface of the finished fabric.

The mechanism for accomplishing this result is shown in Figs. 1, 2 and 3 and more in detail in Figs. 10 to 15 both inclusive, while portions of the mechanism are shown in other figures to which reference will be had as needed.

Mounted on the two rods 108 are sleeves 200, one on each rod and these sleeves are joined together by a bar 201 which may be provided with a stiffening or strengthening rib 202.

Rising from each sleeve 200 is a standard 203 and these standards carry two parallel bars 204, 205 in appropriate spaced relation and extending from one standard 203 to the other standard 203. The bars 204 and 205 are provided with matching passages 206, 207 respectively for journal bearings on crank shafts 208 each of which is provided with a crank extension 209 beyond the bar 208 and at the end of the angle extension 209 there is mounted a roller 210. At the outer end of the crank portion of each crank shaft 208, between the bars 204 and 205 there is pivoted a link 211 carrying at its lower end by a suitable pivotal connection a hook 212 with a hook end 213 upstanding and in spaced relation to the lower end of the body of the hook 212, it being understood that the hook 212 is hung from the link 211 and has an extent of vertical movement in the loom.

Spaced from and parallel with the bar 201 is another bar 214 supported from the bar 205 by webs or brackets 215. The hooks 212 move in the direction of their length between the bars 201 and 214 and are sufficiently thick where traversing the space between these bars to come in contact one with the other, this maintaining the hooks 213 in proper spaced relation. Each hook 212 is provided with a feather 216 engaging a groove 217 in the adjacent face of the bar 214 thus further serving to maintain the proper position of the hooks 212. Whenever the crank shafts 208 are turned in their bearings so that the crank portions between the bars 204 and 205 are pendent then the hooks 212 are in their lowermost position and a turning of the shaft 208 to elevate the crank portions thereof between the bars 204 and 205 will result in an elevation of the hooks 212 to a commensurate extent. The standards 203 also carry at their upper ends guide frames 218 in which there is capable of sliding a bar 219 having formed in one face a cam groove 220 of a size to freely and snugly receive the rollers 210 on the ends 209 of the crank shafts 208. The groove 220 is formed in two parts in different planes one above the other and at the meeting ends the portions of the groove are joined by an inclined or cam portion 221 of limited length and serving a purpose to be described.

Each sleeve 200 carries a journal bearing 222 for the corresponding end of a shaft 223 extending from one sleeve 200 to the other between the shanks of the hooks 212 and the ends 213 of the hooks. The shaft 223 carries a knife 224 for each hook and so positioned with relation to the hook that the cutting edge 225 of each knife 224 will enter a groove 226, best shown in Fig. 26, along the inner edge of the hook which as shown at 227 is curved between the end 213 and the body portion of the hook, this curved portion 227 being concentric with the longitudinal axis of the shaft 223 when the knife 224 is active. The edge 225 of the knife and one side wall of the groove 224 are then in shearing relation. The shaft 223 near one end carries a radially projecting finger 228 having a degree of curvature in the direction of its length and terminating in a point 229 which however may be somewhat blunt. The purpose of the finger 228 will appear hereinafter. The hook supporting members together with the hook and the shaft 223 are capable of movement along the rods 108 with the supporting sleeves 200. This movement is accomplished by means of a link 230 for each end of the hook carrying structure pivotally connected thereto by means of ears 231, each link being connected at the other end pivotally to one end, and in the particular structure shown the upper free end of an arm 232 rising from and fast to the shaft 125. This shaft has secured thereto other arms 233 projecting therefrom close to the bottom of the loom and at their outer ends carrying weights 234 which may be made adjustable along the arms 233 and this is also true of the weights 124 on the arms 123.

The tendency of the weights 234 acting through the arms 233 and shaft 125 is to move the arms 232 in a direction to move the sleeves 200 and parts carried thereby toward the delivery end of the loom.

The shaft 125 is rocked against the action of the weights 234 by a cam 235 on the shaft 21, this cam being best shown in Fig. 15. The cam 235 engages one of the arms 232 by a roller 236 carried by such arm. It will be understood of course that two cams 235 may be utilized, each cam acting on a respective arm 232. The cams 235 cause a movement of the hooks and the mechanism carrying the same away from the delivery end of the loom toward the other end thereof for a certain distance, while the return movement of the hooks and parts carrying them is caused by the action of the weights 234 after the arms 232 have been released from the cams 235.

The bar 219 is formed on the face opposite to that containing the grooves 220 with a boss 237 containing a socket adapted to receive a pin 238 on a bar or rod 239 mounted to slide longitudinally through bearings 240 in brackets 241 carried by the frame 1 or by connections with the brackets 27 guiding the heddle frames 28 and 29. The bar 239 is connected by a link 242 to one end, and in the particular showing of the drawings the upper end of the lever 243 similar to the lever 136 and similarly mounted in ears 244 formed on a plate 245 secured to the floor upon which the loom rests or to a suitable portion of the frame of the loom. The lever 243 receives motion by a link 246 similar to the link 138 and connected by a pin 247 to the disk 153 in eccentric relation to the axis of rotation of said disk. Of course the disk 153 might be replaced by a crank arm. Whenever the disk 153 is rotated then there is imparted to the bar 239 a movement of reciprocation through the intermediary of the link 246, lever 243 and link 242. The movement of the hook carrying mechanism including the bar 219 in a direction toward the bar 239 is sufficient to carry the boss or socket 237 into receiving relation to the pin 238 so that when the bar 239 is reciprocated the bar 219 participates in such reciprocatory movement.

At a certain time in the operation of the machine the knives 224 are to be actuated. This is accomplished by mechanism best shown in Figs. 18 and 19 and in part visible in Figs. 1 and 2. On the rear face of the gear wheel 22 there is formed a circular rib 248 having at one point a cam projection 249 in the direction of a radius extending from the axis of the shaft 21. In the path of the projection 249 is the free end of a lever 250 pivoted at the other end on the frame 1 at an appropriate point, and this lever 250 is connected by a link 251 to a slidable bar 252 mounted in bearings 253 and 254 carried by the frame 1. The upper end of the bar which is arranged to move in an approximately vertical path, is bent to one side of the main body of the bar and then again into parallelism therewith and, terminating in an eye 255. When the hook carrying mechanism is at the limit of its travel toward the delivery end of the machine the finger 229 projects through the eye 255 as shown in Figs. 11 and 14.

The bar 252 is maintained in a normally elevated position by means of a spring 256 secured at one end to the frame 1 and at the other end to an arm 257 on said bar. The bearing 254 for the bar 252 is so shaped that while the bar is capable of moving in the direction of its length through said bearing it may also rock in said bearing about a horizontal axis. The guiding bearing 253 permits the longitudinal movement of the bar 252 through it but is sufficiently elongated so that the corresponding end which is the lower end of the bar may move laterally for a limited extent. The action of the spring 256 is such as not only to maintain the bar 252 in the normally elevated position, but to carry the lower end of the bar toward the outer end of the bearing 253, at the same time through the link 251 maintaining the free end of the lever 250 in engagement with the concentric portion of the rib or flange 248.

On the bar 252 there is a stud or roller 258 in the path of a radial finger or cam 259 on the shaft 24.

When the lever 250 rests against the concentric portion of the rib or flange 248, then the lower end of the bar 252 is at the outer end of the bearing 253, and the roller or pin 258 is out of the path of the cam or finger 259 of the shaft 24. When the cam projection 249 engages the lever 250 then the latter is moved about its pivot in a direction to force the bar 252 against the action of the spring 256 toward the inner end of the bearing 252 until the pin or roller 258 is in the path of the finger or cam 259 when the latter will engage the roller 258 and move the bar 252 against the action of the spring 256 longitudinal of the bearings 254 and 253 to an extent sufficient to cause a rocking of the shaft 223 by an engagement of the eye end of the bar 252 with the finger 229 and the extent of the rocking movement of the shaft 223 under these circumstances is sufficient to cause the knives 224 to actively move with relation to the hooks 212 along the grooves 226 for a purpose which will presently appear. This action only takes place when the cam 249 engages the lever 250 and rotative movement of the cam or finger 259 under any other conditions is inactive.

The general operation of the machine is shown in Figs. 21 to 28 in so far as the forming of the tufts and the placing of the same in the fabric, and in connection with the operation of the machine reference will be had to other figures as needed.

In Fig. 21 the heddles 28 and 29 are shown as spreading the warps while the reed 105 is in the retracted position ready for the passage of the shuttle which is indicated as traversing the race formed by the reed blades. This causes the laying of the weft strand 69 through the warp shed and when the shuttle has moved into the terminal portion of the race then the reed advances so that the edges 112 of the beater blades 104 carry the weft strand 69 to the crossing point of the warp strands as shown in Fig. 22. The reed 105 is again retracted and the heddles reversed thus crossing the warp strands about the weft strands, and then the reed again advances to bring the beater blades once more against the weft strand to again beat it up. These operations are indicated in Figs. 23 and 24. Once more the reed 105 is retracted, but this time the hooks 212 move with it until the interior of the hook is in line with the path of the tube 178. This tube is now advanced carrying the tuft strand 180 through the space between the body members of the hooks and the ends 213, the hooks in the meantime having been dropped so that their lower portions are below the pins 114, the normal position of the hooks being with the lower portions above the pins 114, and the tube 178 traverses the space within the hooks between the lower portions of the hooks and the pins 114. When the tube 178 is retracted, which occurs after the strand 180 has been caught by the gripper 181, the strand then is lodged in the space between the pins 114 and the bottom of the hooks 212.

The movement of the hook mechanism with the reed toward the retracted position of the latter has brought the bar 219 against the bar 239 with the pin 238 in the socket 237, and then the lever 243 is actuated to move the bar 239 longitudinally and the bar 219 participates in this movement, causing the rollers 210 of the arms 209 to ride successively up the incline 221 of the groove 220 and thereby depress the hooks so that the tube 178 will traverse them when it carries the strand 180 toward the gripper. In the timed operation of the parts the direction of movement of the bar 239 is reversed as soon as the tube 178 has been retracted, or this reversal of direction of movement of the bar 239 may begin while the tube 178 is still in motion toward the retracted position. As the bar 239 moves toward its initial position the cam or inclined portion 221 of the groove 220 acts on the arms 209 to cause the successive lifting of the hooks in the reverse order of the lowering of these hooks. That hook which is nearest to the gripper for the strand 180 is the first hook to be elevated and draws the strand around adjacent pins 114 and above the same to form a loop, the necessary amount of strand 180 for this purpose feeding under the pawl at the end of the tube 178. The same operation occurs with the next and succeeding hooks as they are operated by the movement of the crank shafts 208 and since the hooks act in succession from the gripper toward the tube 178, frictional engagement of the strand 180 with the hooks and pins, except with one hook and pin at a time, is avoided.

The bar 239 carries the member 199 and also another member 260 so positioned that as the bar 239 completes its active movement the member 199 is brought into active engagement with the lever 196 and the member 260 is brought into engagement with the lever 187. The lever 196 when moved by the member 199 engages the cam surfaces 194 of the cutter arms 189 and 190 and brings the shearing edges 193 into severing relation with the strand 180, while at the same time the member 260 moves the lever 187 in a direction to release the gripper arms 183 to the action of the spring 188 so that the end of the strand 180 engaged by the lever is released.

It will be observed that the cutters 189 and 190 are located close to the end of the tube 178 when in its retracted position so that there is but a short length of the strand 180 projecting from the inner end of the tube but this projecting end of the strand is sufficient to enter between the jaws 184 and to be gripped thereby. The operations just described having been completed the hooks are related to the reed as indicated in Fig. 27. Now the hooks and the reed move together toward the crossing point of the warp strands and the looped tuft strand is carried to such point so that alternate warp strands enter the looped tuft strand from above and the other warp strands enter the looped tuft strand from below. At this time the free end of the finger 229 has entered the eye 225 of the bar 252 and the cam 249 engages the lever 250 and by the link 251 has moved the bar 252 against the action of the spring 256 until at the inner end of the bearing 253. Now the arm or cam 259 engages the roller 258 and moves the bar 252 downward against the action of the spring 256 causing a rocking of the shaft 233 by the engagement of the eye end of the bar 252 with the finger 229. This causes the cutting edges of the knives 224 to pass over those portions of the tuft strands overlying the part of the hooks 212 traversed by the said knife and these portions of the strands are thereby severed, the shaft 223 returning to its first position and carrying the knives 224 back with it. Now another weft strand 69 is carried through the warp shed and beaten up and the heddles reversed and the operations described with reference to Figs. 21 to 28 are repeated.

It will be understood that the several mechanisms are so constructed and timed in operation as to perform their functions in proper sequence. The warp strands are fed step by step as needed, the heddle operating mechanism becomes active intermittently at the proper time, the picker motion throws the shuttle in proper relation to the action of the tuft forming mechanism, the reed is moved to carry the beater blades in active position the necessary number of times by the several members of the cam 127, the hooks are moved to proper relation to the tuft strand feeding tube and are then lowered and the tuft strand is thrown across these hooks and the tube withdrawn and then the hooks are elevated successively to form the tuft strands into loops, the gripped end of the tuft strand is released and the other end is severed from that portion of the strand coming from the tube 178, and then the looped tuft strand is carried to the crossing point of the warp strands, and the upstanding portions of the loops of the tuft strand are then severed to present raw ends forming the exposed or wearing surface of the finished fabric.

The invention has been described as applied to a power loom, but the use of the invention is not limited to a power loom for there are features of the invention which are applicable to hand looms, for instance, the manner of forming the loops of the tuft strands may under some circumstances be applied with advantage to a hand loom. For this reason it is to be understood that the invention is not limited particularly to the showing of the drawings but may be variously modified while still retaining the salient features of the invention.

What is claimed is:

1. In a loom a series of hooks, means for imparting longitudinal movement to all of said hooks, means for moving each of said hooks transversely and a cutting mechanism arranged in the path of said hooks and actuated when the same are at the limit of their longitudinal movement.

2. In a loom, a series of loop-forming hooks active to a single strand, a beater, a plurality of spring pressed pins carried by said beater and co-acting with said hooks to form loops, said beater and hooks having an independent longitudinal movement.

3. In a loom, a series of loop-forming hooks, means for imparting longitudinal movement to all of said hooks, and means for moving each of said hooks transversely to their line of travel as an entirety, a beater, a plurality of spring pressed pins carried by said beater, said pins co-acting with said hooks to form loops, said beater and loops being capable of independent longitudinal movement.

4. In a loom, a series of hooks active to a single strand, means for moving all of said hooks longitudinally, said hooks being capable of an independent transverse movement, a beater capable of longitudinal movement, a plurality of spring-pressed projections carried by said beater, said projections and said hooks interdigitating to loop said strand, said projections releasing said strand when the hook and beater are at the limit of their longitudinal movement.

5. In a loom, a series of loop-forming hooks, a frame pivotally supporting said hooks, a shaft supporting said frame, a beater mounted for longitudinal movement on said shaft, and means carried by said beater and co-acting with said hooks to loop a tuft strand.

6. In a loom, a series of loop-forming members active to a single strand, a frame pivotally supporting said members, a beater, a plurality of projections carried by said beater, said projections co-acting with said hooks to loop said strand, means for imparting a longitudinal movement to the hook support and to said beater, said beater and support moving as a unit during their contact with said strand, said beater being capable of movement independent of said hook support.

7. In a loom, a series of loop-forming hooks active to a single strand, a plurality of parallel rods, cranks rotatably supported by said rods, said cranks pivotally supporting said hooks, said cranks being provided with angular extensions, a rod, said rod being provided with a cam slot arranged to receive the enlarged end portions of said angular extensions, and means for reciprocating said rod to raise said hooks.

8. In a loom, a series of loop-forming hooks active to a single strand, a plurality of parallel rods, cranks rotatably supported by said rods, said cranks pivotally supporting said hooks, said cranks being provided with angular extensions, a rod, said last mentioned rod being provided with a cam slot arranged to receive the enlarged end portions of said angular extensions, and means for reciprocating said rod to raise said hooks.

9. In a loom, a series of loop-forming hooks active to a single strand, means for pivotally supporting said hooks, means for moving all of the hooks longitudinally, and means for imparting a transverse movement to each of said hooks independent of the adjacent hooks, a cutter shaft in the path of travel of said hooks, said cutter shaft being actuated when the hooks are at the limit of their active longitudinal movement.

10. In a loom, a series of loop-forming hooks active to a single strand, means for imparting longitudinal movement to all of said hooks, means for imparting a movement to said hooks at right angles to their line of travel, guides arranged to direct said last mentioned movement, a cutter shaft in the path of travel of said hooks, said cutter shaft being rotated when the hooks are at the limit of their longitudinal movement.

11. In a loom, a series of loop-forming members active to a single strand, means for imparting longitudinal movement to all of said members, and means for imparting a transverse movement to each of said members, a cutter shaft arranged in the path of travel of said members, knives, arranged on said cutter shaft, and means for actuating said knives to enter recesses in said loop-forming members to sever the loop formed by said members when the same are at the limit of their longitudinal movement.

12. In a loom, a series of loop forming members, individual actuating means for said members, means for causing the successive actuation of said actuating means, a cutter shaft traversing said loop forming members, cutters on said shaft in operative relation to the loop forming members at one limit of their movement under the action of the actuating means, and means for causing the cutters to traverse the loops on the loop forming members.

13. In a loom, a series of reciprocable hooks, crank shafts individual to the hooks and carrying the latter, an actuating means for the crank shafts acting thereon in succession, a carrier for the hooks, crank shafts and actuating means therefor, means for moving the carrier to different parts of the loom, and means at one limit of movement of the carrier engaging the actuating means for the crank shafts to cause the operation thereof.

14. In a loom, a loop forming mechanism active to a single strand, said mechanism including a plurality of interdigitating members, means for independently moving said members longitudinally, and means for simultaneously imparting longitudinal movement to said members while in engagement with the strand.

15. In a loom, a plurality of longitudinally movable loop forming members active to a single strand, one of said members being provided with interdigitating strand-engaging devices, means for moving one of said members transversely, and means for simultaneously imparting longitudinal movement to both of said members, while in engagement with the strand.

In testimony that we claim the foregoing as our own, we have hereto affixed our signatures in the presence of two witnesses.

ERNEST W. CRUIKSHANK.
MILTON R. ELMORE.

Witnesses:
BENJAMIN BECK,
JOHN HENRY SKEEN.